May 10, 1927.
F. KUEHNEL
1,628,606
SPEED CONTROL
Filed June 15, 1925      3 Sheets-Sheet 2
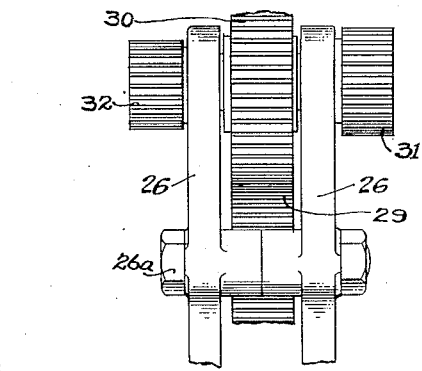
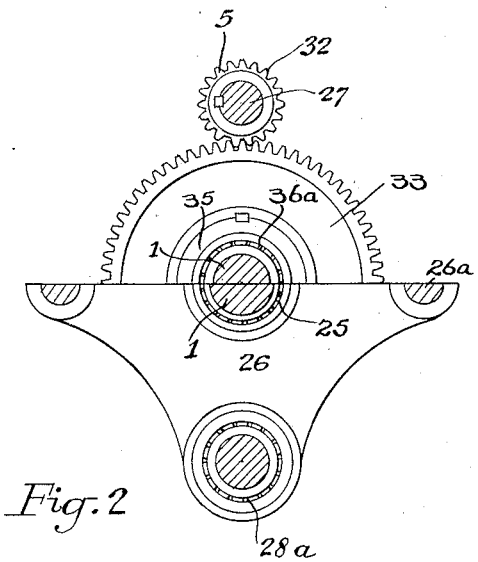
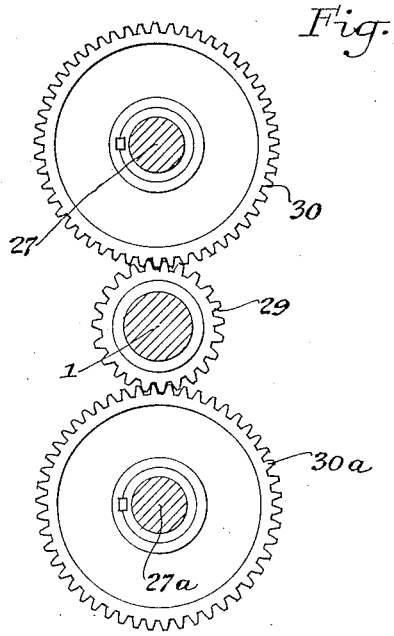
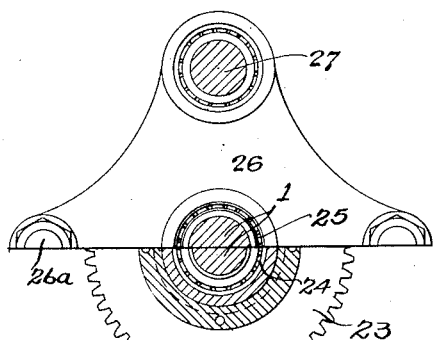
INVENTOR
Franz Kuehnel
Gerald F. Baldwin
BY  ATTORNEY May 10, 1927.   1,628,606
F. KUEHNEL
SPEED CONTROL
Filed June 15, 1925   3 Sheets-Sheet 3

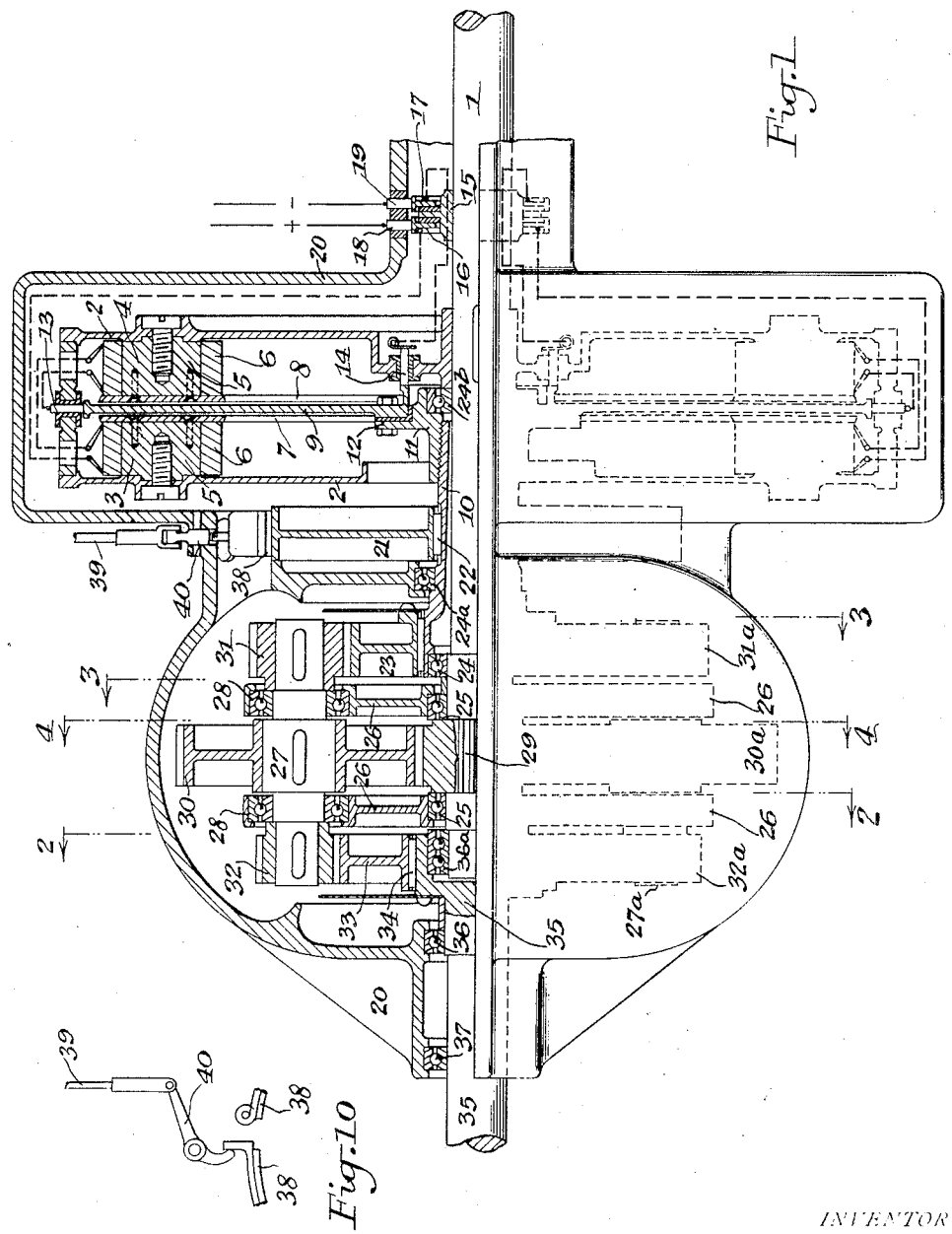

INVENTOR
Franz Kuehnel.
BY Gerald F. Baldwin
ATTORNEY

Patented May 10, 1927.

1,628,606

UNITED STATES PATENT OFFICE.

FRANZ KUEHNEL, OF DETROIT, MICHIGAN, ASSIGNOR OF ONE-HALF TO HANS HUENERT, OF DETROIT, MICHIGAN.

SPEED CONTROL.

Application filed June 15, 1925. Serial No. 37,354.

This invention relates to improvements in speed controls for automobiles, and refers more particularly to a means for operating and controlling the transmission, in both forward gear and reverse, and the service brakes from a conveniently located operating handle without the aid of clutch or brake pedals.

It is an object of the invention to provide means for generating electricity by the rotation of the engine shaft, and utilizing the current thus generated for regulating the forward speed of the drive shaft, or for rotating the latter in a reverse direction, through planetary transmission. Or again the current generated may be employed for the application of the service brakes.

With these and numerous other objects in view which will be mentioned as the specification proceeds, the invention consists in certain novel construction and combination of parts hereinafter more fully described with the aid of the accompanying drawings and claimed.

In the drawings:—

Figure 1 is a longitudinal section through the electric generating mechanism and the planetary transmission.

Figures 2, 3, and 4 are sections on the lines 2—2, 3—3, and 4—4 respectively of Figure 1.

Figure 5 is a partial side elevation of the supporting brackets for the planetary transmission.

Figures 6, 7, 8, 9:
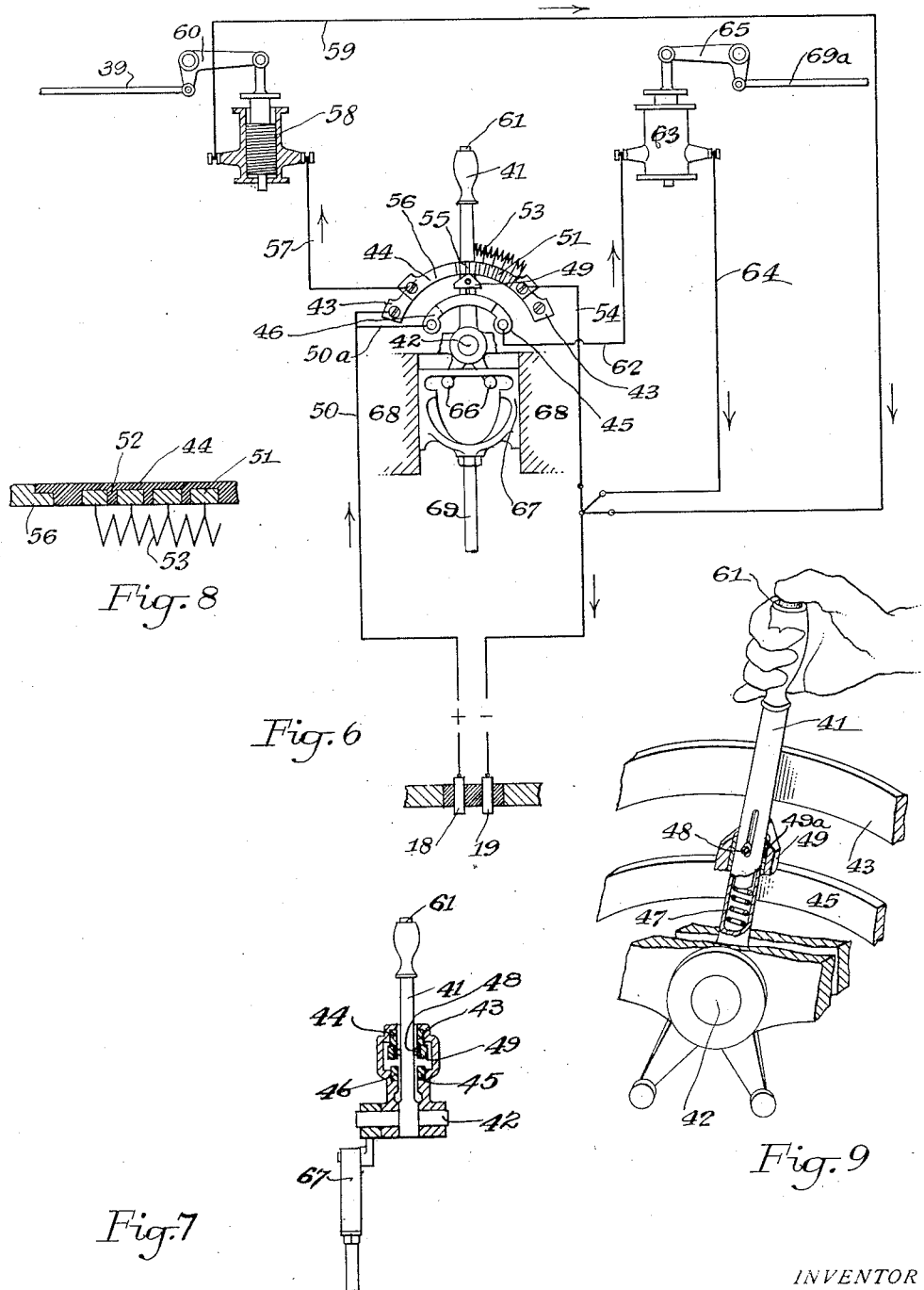
Figure 6 is a diagrammatic view of the controlling mechanism.

Figures 7, 8, and 9 are details of the controlling mechanism.

Figure 10 is a detail.

Referring more particularly to the drawings, 1 designates part of the shaft of an engine or motor, on which a housing 2 is keyed or otherwise secured. On the housing a plurality of pairs of magnets 3 and 4 of opposite polarity are arranged which consist of cores 5 surrounded by windings 6. An annular plate 7 is secured against the inner surface of the magnets 3, and a similar plate 8 against the inner face of the opposite magnets 4. Between the plates 7 and 8 is a disc 9, which is secured to the sleeve 10 by a connecting member 11, but the disc is insulated from the latter by insulation 12. Mounted in the housing 2, but insulated therefrom, are brushes 13 and 14 which wipe the outer and inner circumferences of the disc 9.

A commutator 15 is also mounted on the shaft 1, the rings 16 and 17 of which are wiped by the brushes 18 and 19 supported by, but insulated from, the casing 20.

The number of brushes 13 and 14 must correspond to the number of pairs of magnets 3 and 4. The winding on each magnet 3 is connected to the ring 16 and also to the opposite magnet 4. The winding on each magnet 4 is also connected to a brush 13, and each brush 14 is connected to the ring 17. So that the rotation of the shaft 1 causes the magnets 3 and 4 and the commutator 15 to act as a generator so that current is generated which may be utilized for the rotation of the disc 9, or for other purposes which will be mentioned hereinafter.

On the sleeve 10, which is arranged around the shaft 1, a pulley 21 is secured as by a key 22, and towards the outer end of the sleeve a gear 23 is also arranged. The outer end of the sleeve is rotatably mounted on a ball bearing 24, and a second ball bearing 24$^a$ may also be employed if desired. The inner end of the sleeve is supported by a bearing 24$^b$.

On the shaft 1, and supported by ball bearings 25, rotatably mounted brackets 26 are arranged which carry the shafts 27 and 27$^a$ in ball bearings 28 and 28$^a$. The brackets 26 are held in correct relation to one another by bolts 26$^a$. On the shaft 1 a pinion 29 is secured which meshes with gears 30 and 30$^a$ secured to the shafts 27 and 27$^a$ respectively. The gear 23 meshes with pinions 31 and 31$^a$ which are keyed or otherwise secured to their respective shafts 27 and 27$^a$, as also are the pinions 32 and 32$^a$. The latter pinions are in mesh with the gear 33 secured as by the key 34 to the drive shaft 35. The latter is supported as by bearings 36 and 37 in the casing 20, and also by a ball bearing 36$^a$ mounted on the shaft 1. It will also be noted that the pinions 32 and 32$^a$ are smaller than the pinions 31 and 31$^a$.

A brake band 38 is arranged round the pulley 21 so that when the rod 39 is pulled upwards the lever arm 40 will be actuated and the brake band 38 tightened against the pulley.

The control lever 41 is pivotally mounted as at 42, and swings between the outer segments 43 and 44 and the inner segments 45 and 46. These pairs of outer and inner segments are of substantially the same length and are placed opposite each other, but for clearness in showing connections they are otherwise illustrated in the diagrammatic view in Figure 6. In the lower end of the lever arm 41 is a spring 47 which tends to force the insulated pin 48 outwards so as to maintain the outer end of the connector 49 in contact with the underside of the outer segments 43 and 44. 49ª indicates annular insulation by which the connector 49 is insulated from the operating lever 41. The segment 43, which consists of a plain metal strip throughout its length, is connected by the lead 50 to the brush 18 on the commutator, and the segment 44, part of which is shown in detail in Figure 8, consists of insulating material 52 in which a series of contacts 51 are arranged. Each contact is connected to the resistances 53, so that current of varying intensity will flow back through the lead 54 to the brush 19. In this manner the speed of rotation of the disc 9 is controlled. The resistances are so arranged that when the centre contact 55 is connected as shown in Figure 6, the speed of rotation of the disc 9, and therefore of the pinion 31 and 31ª, is such that they will counteract the rotation of the gears 30 and 30ª in the planetary transmission, with the result that the drive shaft 35 will not revolve. Obviously as the resistances 53 are gradually cut out the speed of the disc 9, and therefore of the gears 31 and 31ª, will increase. Again when the lever arm 41 is moved past the centre position and away from the resistances, so that contact is made between the segments 43 and the contact 56, current flows through the lead 57, through the solenoid 58, and the wire 59 back to the brush 19. The solenoid operates the lever arm 60 connected to the rod 39, so that when the solenoid is energized the brake band 38 is tightened up round the pulley 21, and the sleeve 10 and gear 23 held stationary. Thus a reverse movement of the drive shaft 35 is obtained when the engine shaft 1 and the pinions 29 continue to revolve.

By pressing the rod 61 and compressing the spring 47, the connector 49 is forced downwards against the inner segments 45 and 46. When this is done the lead 50ª is connected to the wire 62 and the solenoid 63 is energized. 64 indicates the negative connection from the brush 19 to the solenoid 63. The lever arm 65 connected to the solenoid is also connected to the brake rod 69ª in any desired manner. So that by pressing the rod 61 inwards at any position of the operating lever the service brakes (not shown) may be applied, and the current generated is then utilized in the solenoid and therefore does not rotate the disc 9 as it would if the drive shaft were at the time travelling in a forward direction.

On the underside of the lever arm 61 I provide depending lugs 66 which engage a plunger 67 operating in guides 68, so that the rod 69 is raised as the lever arm 41 is moved sideways in either direction. The rod 69 is connected to the gas intake of the carburetor (not shown), so that the mixture may be increased in strength when greater effort is to be exerted.

While in the above description and drawings two brushes 18 and 19 are shown and described, it is obvious that a ground connection can be substituted for the latter brush if preferred.

In the foregoing the preferred embodiment of the invention has been described, it is however understood that the construction is susceptible to such modifications as fall within the scope of the appended claims.

What I claim as my invention and desire to secure by Letters Patent is:

1. A speed change transmission gearing of the type in which a drive shaft supporting a dynamo-electric machine is associated with a driven shaft, the relative speed of which is controlled by a movable induction element of the dynamo-electric machine, including a brake fixedly connected with the induction element of the dynamo-electric machine, conductors carrying the current generated by said machine, and means for varying said current and for applying said brake respectively.

2. A speed change transmission gearing of the type in which a drive shaft supporting a dynamo-electric machine is associated with a driven shaft, the relative speed of which is controlled by a movable induction element of the dynamo-electric machine, including a brake fixedly connected with the induction element of the dynamo-electric machine, and means for utilizing the current generated by the dynamo-electric machine for applying said brake.

3. A speed change transmission gearing of the type in which a drive shaft supporting a dynamo-electric machine is associated with a driven shaft, the relative speed of which is controlled by a movable induction element of the dynamo-electric machine, including a switch lever adjustable to different positions, circuit connections controlled by the switch lever in certain positions for varying the speed of the driven shaft relatively to that of the driving shaft, and circuit connections controlled by the switch lever in other positions for reversing the driven shaft relatively to the driving shaft.

4. A speed change transmission gearing of the type in which a drive shaft supporting a dynamo-electric machine is associated with a driven shaft, the relative speed of which is controlled by a movable induction element of the dynamo-electric machine, including a solenoid, a brake fixedly connected with the induction element of the dynamo-electric machine, a mechanical connection between said solenoid and said brake, circuit connections containing resistances in the circuit of the dynamo-electric machine, and a switch lever adjustable to positions for sending the current through said resistances and through said solenoid respectively.

5. A speed change transmission gearing of the type in which a drive shaft supporting a dynamo-electric machine is associated with a driven shaft, the relative speed of which is controlled by a movable induction element of the dynamo-electric machine, including a pair of solenoids in the circuit connections of the dynamo-electric machine, and means under control of the operator for selectively sending said current through either of said solenoids, and brakes actuated by said solenoids.

6. A speed change transmission gearing of the type in which a drive shaft supporting a dynamo-electric machine is associated with a driven shaft, the relative speed of which is controlled by a movable induction element of the dynamo-electric machine, including a brake fixedly associated with the induction element of the dynamo-electric machine, a solenoid, a mechanical connection between said solenoid and said brake, a second solenoid, another brake rod adapted to operate service brakes, a second mechanical connection between said second solenoid and said other brake rod, and means under control of the operator for selectively sending the current to either of said solenoids.

7. A speed change transmission gearing of the type in which a drive shaft supporting a dynamo-electric machine is associated with a driven shaft, the relative speed of which is controlled by a movable induction element of the dynamo-electric machine, including separate sets of contact segments, one set of contact segments being connected with resistances adapted to consume the current generated by the dynamo-electric machine, the other set of contact segments being associated with a solenoid, a brake rod operable by the solenoid, and a single operative element for sending the current of said dynamo-electric machine through either one of said sets of contact segments.

8. A speed change transmission gearing of the type in which a drive shaft supporting a dynamo-electric machine is associated with a driven shaft, the relative speed of which is controlled by a movable induction element of the dynamo-electric machine, including two sets of spaced contact segments, an operating lever, a connector movably mounted on said operating lever and adapted to connect the contact segments of one set in one terminal position and the contact segments of the other set in the other operative position, current consuming devices connected with said sets of segments respectively, and means on the operating lever for shifting said connector from one of its terminal positions to the other.

9. A speed change transmission gearing of the type in which a drive shaft supporting a dynamo-electric machine is associated with a driven shaft, the relative speed of which is controlled by a movable induction element of the dynamo-electric machine, including a single means actuatable by an operator for selectively varying the speed of the driven shaft, a carburetor adjusting rod and a connection between said rod and said single means for effecting adjustment of the carburetor upon actuation of said single means.

FRANZ KUEHNEL.